United States Patent [19]
Klotz, Jr.

[11] Patent Number: 5,459,307
[45] Date of Patent: Oct. 17, 1995

[54] SYSTEM FOR STORAGE AND RETRIEVAL OF DIGITALLY ENCODED INFORMATION ON A MEDIUM

[75] Inventor: Leigh L. Klotz, Jr., Palo Alto, Calif.

[73] Assignee: Xerox Corporation, Stamford, Conn.

[21] Appl. No.: 159,153

[22] Filed: Nov. 30, 1993

[51] Int. Cl.⁶ .................................................. G06K 7/10
[52] U.S. Cl. ........................................ 235/454; 235/494
[58] Field of Search ................................. 235/432, 454, 235/494

[56] References Cited

U.S. PATENT DOCUMENTS

| | | | |
|---|---|---|---|
| 4,760,247 | 7/1988 | Keane et al. | 235/454 |
| 4,795,894 | 1/1989 | Jugimoto et al. | 235/468 |
| 4,877,948 | 10/1989 | Krueger | 235/454 |
| 4,926,035 | 5/1990 | Fujisaki | 235/494 |
| 4,964,066 | 10/1990 | Yamane et al. | 235/454 |
| 5,001,330 | 3/1991 | Koch | 235/454 |
| 5,039,847 | 8/1991 | Morii et al. | 235/454 |
| 5,091,966 | 2/1992 | Bloomberg et al. | 235/494 |
| 5,128,525 | 7/1992 | Stearns et al. | 235/494 |
| 5,140,139 | 8/1992 | Shepard | 235/454 |
| 5,159,668 | 10/1992 | Kaasila | 395/151 |
| 5,168,147 | 12/1992 | Bloomberg | 235/494 |
| 5,245,165 | 9/1993 | Zhang | 235/494 |
| 5,245,166 | 9/1993 | Shepard | 235/454 |
| 5,278,400 | 1/1994 | Appel | 235/494 |

FOREIGN PATENT DOCUMENTS

124080 5/1989 Japan.

Primary Examiner—F. L. Evans

[57] ABSTRACT

The present invention involves a novel form and method for creating and using document sized file storage sheets containing one or more files. The present invention employs a user model similar to that of a floppy disk. A storage sheet made in accordance with the principles of the present invention comprise at least one sheet of an information storing substrate material, commonly paper. A system for the inputting and processing of storage sheet images is disclosed. The storage sheet comprises a machine readable mark (a "file storage sheet flag") which alerts the system is currently reading a file storage sheet. Upon image input, this flag is deliberately scanned for by the system. The storage sheet also comprises a machine readable directory that informs the system about the general characteristics of the files stored on the sheet. Such general information may include the name of the files, the number of bytes, creation date, owner, the location of the first byte of the file on the sheet, and the like. If the current file storage sheet comprises more than one sheet, then the directory may inform the system where the files are located among the separate sheets. A file storage sheet may optionally comprises a human readable label and a human readable directory.

16 Claims, 4 Drawing Sheets

SYSTEM FOR STORAGE AND RETRIEVAL OF DIGITALLY ENCODED INFORMATION ON A MEDIUM

FIELD OF THE INVENTION

The present invention relates in general to the creation and use of document sized file storage sheets and, in particular, to file storage sheets that have machine readable files and a flag which induces a document processing system to store the files.

BACKGROUND OF THE INVENTION

Removable external storage media for computers have existed for many years. In fact, punched paper cards developed by Jacquard for controlling looms predate the modern stored program computer. These punched cards have reappeared as removable storage of both programs and data for early generations of large and mid-sized computers. Similarly, punched paper tape provided a means for storing information for both mechanical devices such as teletypewriters and for digital stored program computers.

As storage substrate technology improved, the cost of storage decreased while, simultaneously, the portability of storage increased. These trends are evident in the development of removable magnetic storage. Initially, mainframe removable packs of rigid magnetic disks ("disk packs") were used for fast random access. Although disk packs are comparatively bulky; they are nonetheless portable from mainframe to mainframe. As smaller computers developed, more portable random access mechanisms for storing small amounts of data were developed. The eight inch "floppy disk" allowed a modicum of information to be stored, retrieved, and cataloged off-line. These first floppies were more convenient than either magnetic tape or disk packs and were much less expensive.

Five-and-a-half inch floppy "diskettes" followed, and were dominant for a number of years. These floppy disks are more convenient for handling and storing than their eight inch predecessor. Additionally, these floppies stored more information due to advances in substrate material, recording/playback technology, and processing technology.

Recently, a three-and-a-quarter inch "diskette" format has gained commercial success. No longer "floppy", these diskettes are encased in a semirigid plastic protective shell, providing a more foolproof product for a wider market. Furthermore, the size and protection allow for mailing in standard envelopes, or carrying in standard shirt pockets— something not possible with previous floppy disks.

While this improvement has taken place within the magnetic storage technology, advances in other technologies have also occurred. For example, CD-ROM has grown out of the compact disk digital audio market in the past ten years.

The cost of these media has dropped while their storage capacity has increased since their introduction. A typical three-and-a-quarter inch diskette now holds approximately one megabyte of data and costs about one dollar. A CD-ROM disk presently stores about six hundred megabytes of data and costs about ten dollars.

Central to the operation of all removable media, regardless of storage technology, is the concept of a "file". The concept itself was originally based on the metaphor of a paper file in a filing cabinet. Not until the advent of addressable read/write devices such as magnetic tapes did the concept of a "file" fully develop. Files are ordered collections of digitally encoded data that have an abstract existence independent of their storage medium. Thus, a file can be copied from one storage medium to another and retain its identity. For example, a file might be stored in core memory and copied to a magnetic tape. That magnetic tape, in turn, may be used to download the file into another computer's memory.

Experience with floppy disks and other portable media has shown that the concept of the file is valuable. Its use in over a hundred million of personal computers worldwide has familiarized the public with the concept, and is incorporated into the public consciousness as a basic unit of storage, retrieval, and transportation in the computer world. Files can be stored on floppy disks, tape, or other media and transported to other machines or stored away physically. All of these media are relatively inexpensive and are suited to storage and transportation of large amounts of data.

None, however, is ideally suited to the storage of small amounts of data at a very low price. A typical business letter contains on the order of a thousand bytes of information. Storing the contents of this letter digitally on a floppy disk would cost ten times the amount of the human readable letter paper version, and would waste 99.9% of the storage capacity of the diskette medium.

The primary means of very inexpensive storage for data has, for hundreds of years, been paper. Although the demise of paper has been predicted since the advent of computers, the promise of the "paperless" office has not yet come to pass. In fact, paper carries some important advantages as a medium that make its demise unlikely. For example, paper as a medium is ubiquitous. Paper users are generally more concerned with the stored message than with the substrate medium. By contrast, computer users must still "know" something about the operating system and application programs (e.g. a word processing program) in order to create or read a document.

The format of paper as a medium is standardized. This standardization is of particular benefit to users of documents, since it means low cost access to convenient devices for storing (e.g. :file cabinets, drawers, manila folders, etc.), transporting (e.g. envelopes, facsimile machines) and reproducing (e.g. photocopiers) information. The form factor of paper and its read/write interface have remained stable for nearly a century. By contrast, changes in materials, fabrication, and data recording technology rapidly obsolete magnetic and optical storage media. In these respects, paper has served as nearly ideal for information storage.

In particular, data stored on standardized paper stock (such as letter size, legal size, European or Japanese A4, etc.) can take advantage of the existing paper infrastructure of copiers, file cabinets, envelopes, etc. in order to integrate more fully into existing work practices.

However, until recently, paper has been limited to a human readable storage medium. Recent advances in optical and computer technology have made it possible to use paper as a medium for machine readable information.

Cost reductions and speed increases in digital computer processing units, memories and image scanning devices have made machine readable data storage on paper economically feasible.

Furthermore, paper document handling technology for paper in standard sizes is well understood and highly developed in computers, facsimile machines, and the like. Digital scanners and digital copiers are joining digital facsimile machines in the array of digital electronic paper handling office equipment. With the advent of these digital machines, paper now serves as a means for storing both human readable and machine readable information.

Early methods of storing data on paper, for example bar codes were very low in density and suitable only for identification rather than storage. Higher density encodings, such as Cauzin strip, used rather unsightly formats for the encoding of data. Recently, a more esthetically pleasing method ("glyph" codes) for encoding data on paper has emerged. This "glyph" method for encoding high densities of data on paper in an attractive form is described in pending U.S. patent application Ser. No. 07/887,563 by Zdybel, filed on May 18, 1992, a continuation in part of Ser. No. 07/530, 677 which was filed on May 30, 1990 and is now abandoned, and is assigned to Xerox Corporation. Zdybel et al. is hereby incorporated by reference into the present application.

Returning to the typical business letter example, a digitally encoded version of the contents of the letter could be stored on a single sheet of paper, which could be printed at a cost of about five cents. Such digitally encoded files can be copied using conventional light-lens copiers, or future generation digital copiers. They can be mailed in an envelope, or transmitted in a facsimile machine. They can also be stored in a filing cabinet, or scanned in through a copier or digital scanner to produce a digitally encoded file, abstracted from its medium of encoding.

While a thousand business letters could be stored more economically and more compactly on a floppy disk, a small number of files containing a few business letters are more economically and more conveniently stored on paper using the above mentioned glyph code technology.

It is therefore an object of the present invention to combine the use of paper as a substrate for storing machine readable information, the use of preexisting standardized paper sizes to facilitate integration and the use of the file as a conceptual unit for bundling information to provide a convenient, easily accepted, easily used means of inexpensively storing moderate amounts of data in a typical office or home environment.

SUMMARY OF THE INVENTION

In summary, the present invention involves a novel form, method, and system for creating and using document sized file storage sheets containing one or more files. The present invention employs a user model similar to that of a floppy disk. A storage sheet made in accordance with the principles of the present invention comprises at least one sheet of an information storing substrate material, commonly paper. A system for the inputting, creating, outputting and processing of storage sheet images is disclosed.

The storage sheet comprises a machine readable mark or flag which alerts the system currently reading a file storage sheet. Upon image input, this flag is deliberately scanned for by the system.

The storage sheet also comprises a machine readable directory that informs the system about the general characteristics of the files stored on the sheet. Such general information may include the name of the files, the number of bytes, creation date, owner, the location of the first byte of the file on the sheet, and the like. If the current file storage sheet comprises more than one sheet, then the directory may inform the system where the files are located among the separate sheets.

A file storage sheet may optionally comprises a human readable label and a human readable directory. The label may describe the file storage sheet in general, such as a one phrase or sentence summary. Likewise, the human readable directory may contain any superset or subset of information that is contained in the machine readable directory. It will be appreciated that the human readable label and directory may be either automatically generated, manually entered, or blank, according to the needs of the user.

One advantage of the present invention is that the user can store an electronic file encoding a document on a single or small number of pages, at less cost than a floppy disk.

Another advantage of the present invention is that the storage sheets may be constructed from standard sized paper. Thus, file storage sheets may be used in commercially available paper handling equipment, including any reprographic device, scanner, or the like.

Another advantage of the present invention is uniformity of handling. When a file storage sheet is used to store an electronic version of a human readable paper document, the storage medium of the storage sheet is the same as the presentation medium. That is, the file storage sheet can be bundled together with the paper document and not become separated as would happen if the electronic version were stored on a floppy disk. The file storage sheet and the paper document may thus be processed together.

Another advantage of the present invention is that storage sheets can be stored in a filing cabinet or other paper storage device commonly found in an office or home environment.

Another advantage of the present invention is that the mailing costs for a file storage sheet for a small file are less than those of a floppy disk.

Additional objects and features of the present invention will be more readily apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the drawings.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

Figure 1:
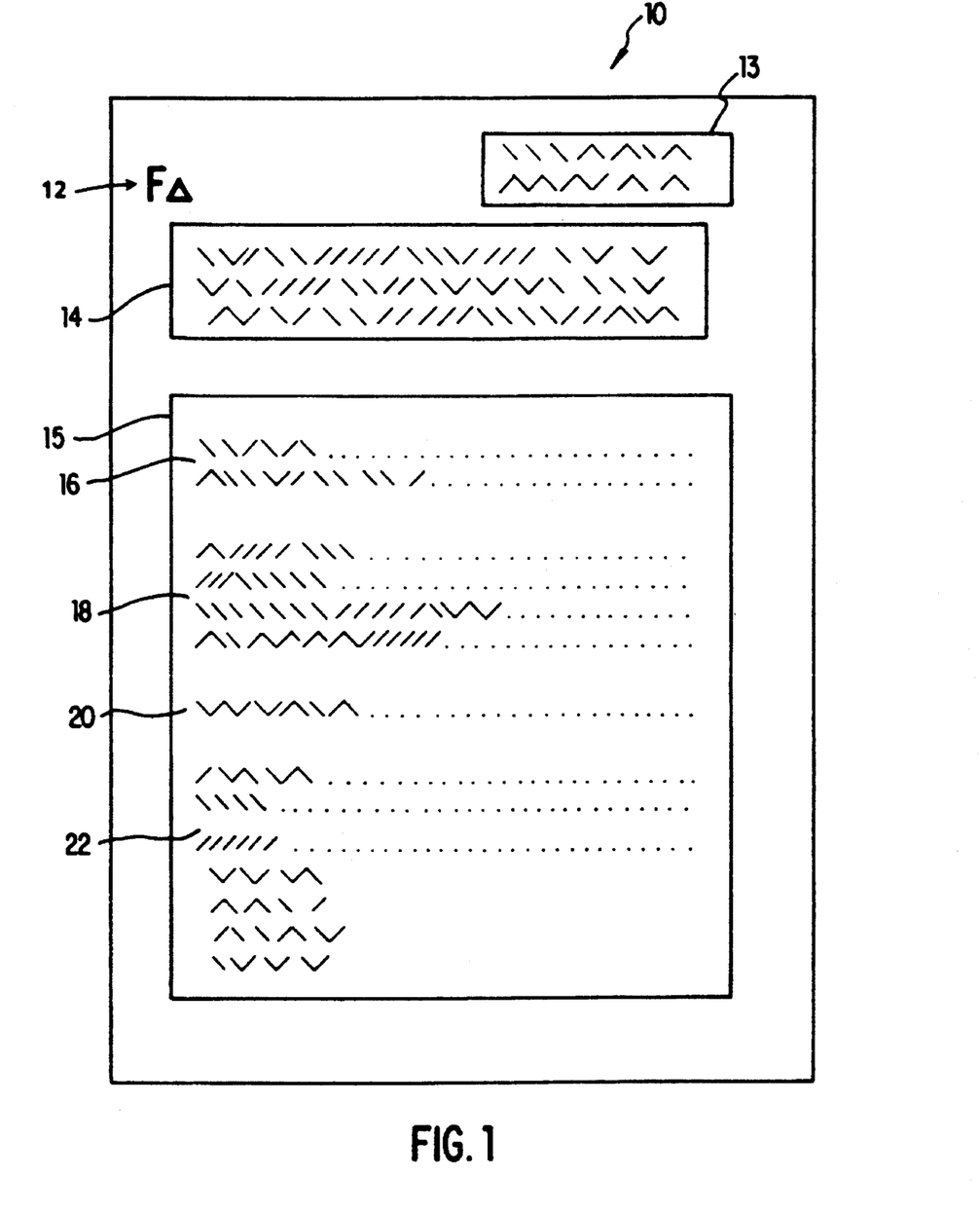
FIG. 1 depicts an embodiment of a file storage sheet made in accordance with the principles of the present invention.

Referring to FIG. 1, a first page 10 of a file storage sheet is shown. Page 10 comprises a number of machine and human readable areas. The machine readable areas comprise: a file storage sheet flag 12, a label 13, a directory 14, and a files area 15. Machine readable file area 15 may comprise one or more digitally encoded files, such as files 16, 18, 20, and 22 depicted in FIG. 1. Although files 16, 18, 20 and 22 are shown as having a definable space between them, it will be appreciated that such a space is not necessary from the system's standpoint. The system need only be appraised of the exact starting and ending point of any file in order to process it correctly. A space may be provided, however, to aid any human user scanning the page.

Human readable areas on page 10 are optional according to the needs of the user. If included, human readable areas may comprise a label and a directory (not shown). These areas may be text translations of some or all of the machine readable label and directory or may include other information such as handwritten messages or the like.

File storage sheet flag 12 informs the system that the current page being read is such a sheet. Once the system is informed that the current page is a file storage sheet, the system "knows" where to scan the page image for file attribute information. This knowledge is retained in the standardization of the file storage sheet format. For example, the system, interpreting a current page, automatically scans the upper left hand corner to determine if the image has a flag, denoting whether the page is a file storage sheet. If so, the system scans the image at standardized locations for the machine readable label and directory. As described in greater detail below, these areas contain information that enables the system to prepare electronic storage space in which to read the binary information on the page.

The machine readable areas are encoded in the presently preferred embodiment with "glyph" markings. A glyph code is a series of linear marks that slant either top left to bottom right or vice versa. Glyphs are a high density form of writing and have proven to be robust in the sense of recovering information after repeated photocopyings. Glyph codes are described in both commonly assigned U.S. Pat. No. 5,060,980, issued to Johnson et al. on Oct. 29, 1991 and in commonly assigned U.S. patent application Ser. No. 07/887,563 by Zdybel, filed on May 18, 1992, a continuation in part of Ser. No. 07/530,677 which was filed on May 30, 1990 and is now abandoned, both references are hereby incorporated by reference. It will be appreciated that the present invention should not be limited to this form of encoding. In fact, the present invention encompasses all forms of digital encoding on paper.

Figure 2:
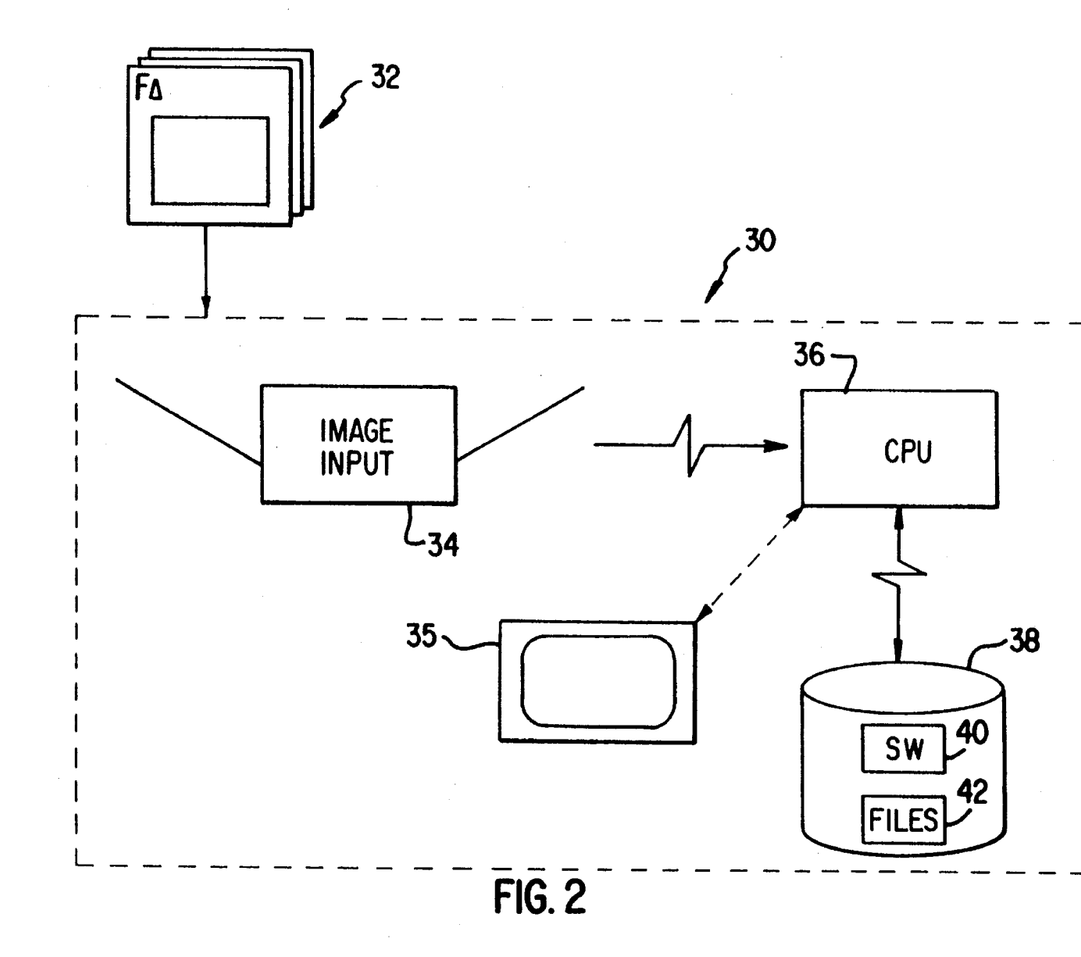
FIG. 2 shows a multi-page file storage sheets being read by a system which recognizes and processes them.

Collectively, the machine readable areas comprise a stored digital file or set of files that can be read and recognized by a document processing system. FIG. 2 depicts a presently preferred system 30 that reads and recognizes file storage sheets. Sheet 32 is read by system 30 via image input terminal 34. Image input terminal 34 represents generically any image capturing device, such as a fax machine, copier, scanner, or the like. The image is captured by terminal 34 under control of central processing unit (CPU) 36. Once captured, the image is further processed by CPU 36 in accordance with the instructions specified in image processing module 40. Module 40 is depicted as being in storage 38. It will be appreciated that storage 38 is generically depicted and may comprises various components, such as cache, RAM, ROM, CD-ROM, floppy disk, or the like. Additionally, it is not a requirement of the present invention that module 40 reside in the same type or module of storage as electronic files 42.

Under module control, CPU 36 processes the image of the file storage sheet. In the presently preferred embodiment, CPU 36 reads the digital data stored on the page, decodes the digital paper file, and stores the resulting electronic translation 42 of the paper file into storage 38. Other image operations involving compilation/transformation of data are possible. For example, encryption/decryption may be performed on the binary data.

Figure 3:
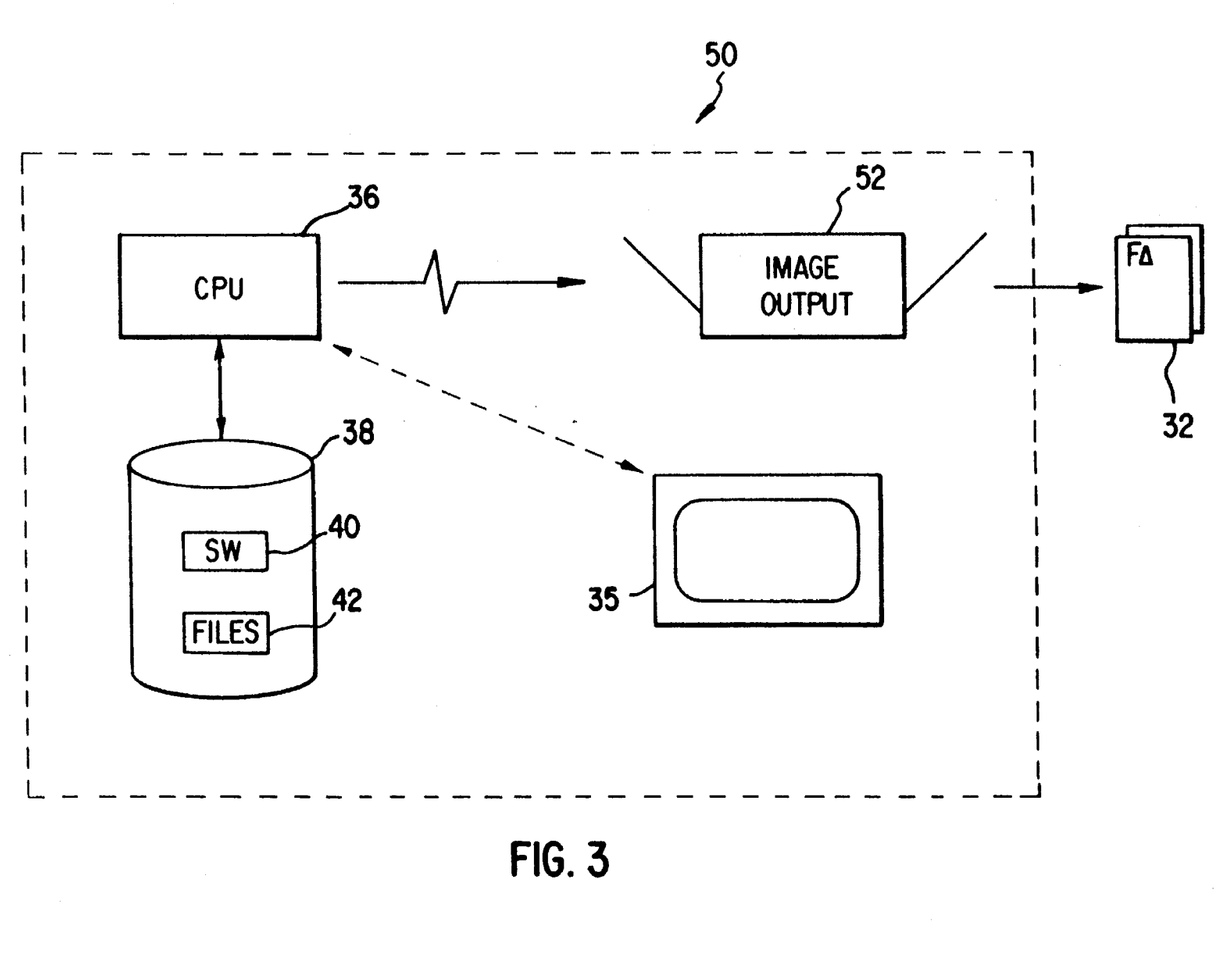
FIG. 3 shows a system that is capable of creating file storage sheets from electronically stored documents.

On the output side, a document processing system may be constructed to create file storage sheets from stored electronic files. FIG. 3 depicts a presently preferred system 50 that creates such sheets. Upon user request, image processing module 40 directs CPU 36 to transform electronic file 42 into a page image that is subsequently sent to image output terminal. As before, storage 38 and image output terminal 52 are generic designations and may encompass all the above mentioned variants. It will be appreciated that the above transformation may take place between a wide variety of data formats and that the present invention encompasses all transformations between possible format domains. For example, the electronic file may be stored as an ASCII file, some word processing format, or the like. Likewise, the image may be formed to conform to any number of page description formats, raster image formats or the like.

Collectively, the machine readable areas comprise a stored digital file or files that is read and recognizable by a document processing system such as a digital copier, system reprographic device, fax machine, page scanner or the like. Upon encountering a storage sheet, the system locates the data from the image of the storage sheet. The data from successive storage sheets that form a set of storage sheets are processed together. The system interprets the aggregate data of the storage sheet or sheets to be files stored on a removable read only external storage device, and reads the file or files and their associated information from the page images. The system then creates one or more electronic files with either specified or default names and stores the information into said file or files.

As a system option, a screen display 35 may be connected to the system. In order to enhance novice user understanding, screen display of the resulting files could be consistent with the floppy disk metaphor. For example, on a computer system with a graphical user interface, when a file is read in from a storage sheet and stored on the system, a folder icon representing the storage sheet could appear, and it could contain individual file icons representing each file read from the storage sheet.

Other floppy disk metaphors can best be presented in computer systems by offering a graphically based method for the creation of storage sheets that is consistent with mechanism for creating new folders or for copying files onto floppy disks. For example, a user could create a new folder, store electronic files in it, and use a mouse or other pointing device to drag the folder to a special icon used solely for the creation of storage sheets. This process would be analogous to that of copying the folder to an icon used for representing a removable floppy disk.

Similarly, a computer system with a mechanism for selecting mass storage devices for storage of files within applications could allow the selection of a storage sheet device which, when stored to, creates and prints out a storage sheet.

Having discussed the presently preferred embodiment generally, a more detailed description of image processing module 40 will now be given to aid the understanding of one skilled in the art.

Table 1 below gives a layout of the data structures utilized by the presently preferred embodiment of the image processing module:

TABLE 1

DATA STRUCTURES

Folder:
    A structure of two values:
        Folder_Name: a string of data bytes
        Files: a list of Files.
File Attribute:
    A structure of two values
        Name: a string of data bytes ("Title", "Author", etc.)
        Value: a string of data bytes.
File:
    A structure of three values
        Attributes: a list of File Attributes
        Length: an integer
        Contents: an unstructured string of data bytes.
Label_Info:
    A structure of three values:
        Name: a string of data bytes
        UID: a string of data bytes
        Page_Count: an integer.
Directory_Info:

TABLE 1-continued

DATA STRUCTURES

Figure 4:
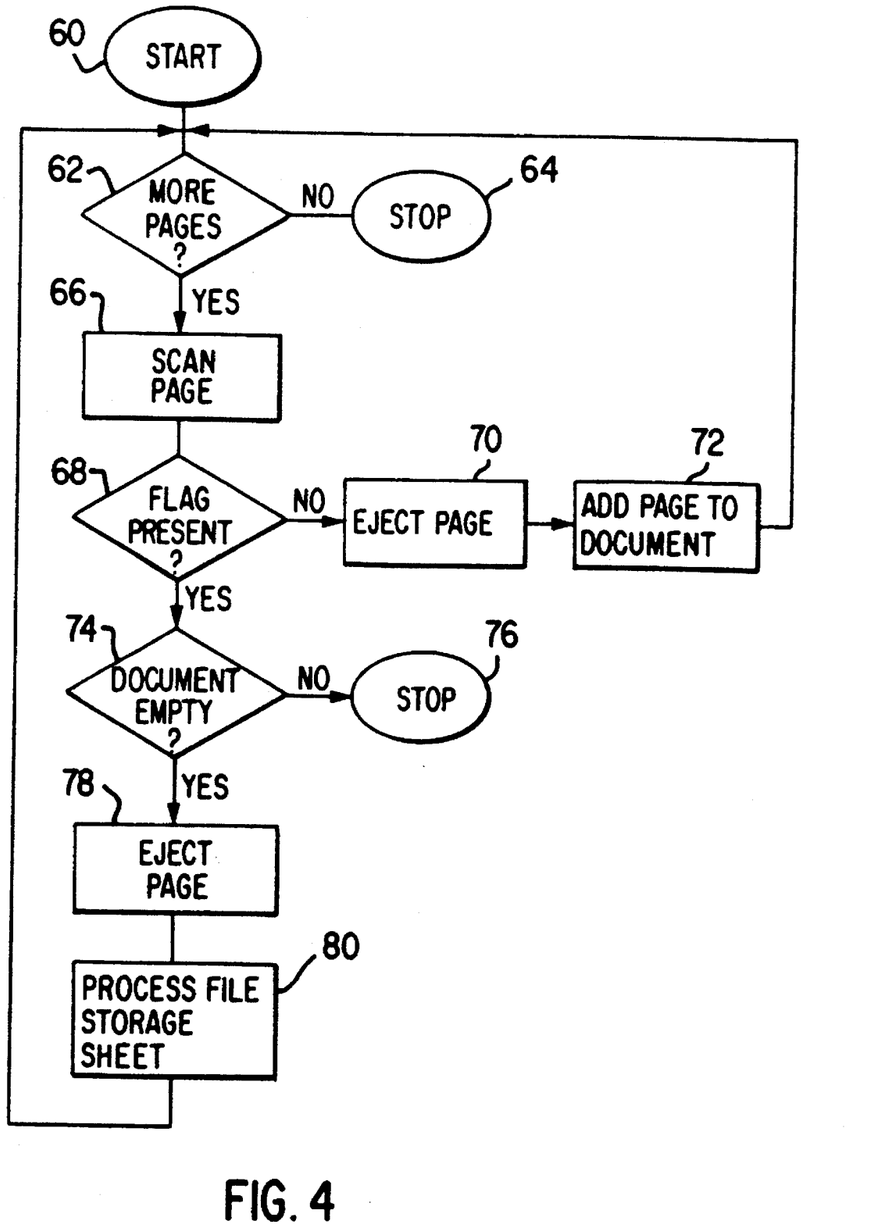
FIG. 4 is a flow chart capsule of the routine which provides the entry point for the processing of file storage sheets as distinguished from ordinary pages of a document.

A structure of one value:
        List of File Attributes.
Page_Label
    A structure of three values:
        UID: a string of data bytes
        Page_Number: an integer
        File_Number: an integer.
Image Areas of Page:
    Label Area
    Directory Area
    Data Area The data structures detailed above are used by the image processing module in regards to reading and creating file storage sheets, as detailed below in Tables 2 and 3 respectively. FIG. 4 is a flow chart capsule of the routine SCAN_DOCUMENT which provides the entry point for processing file storage sheets as distinguished from ordinary pages of a document.

TABLE 2

READING FILE STORAGE SHEETS

```
SCAN DOCUMENT
%     If there are no more pages to be scanned, then return.
BEGIN
  LET document = CREATE_EMPTY_DOCUMENT.
  LOOP
      IF page_not_available RETURN document.
      LET page = SCAN_PAGE.
      % If there is a File_Storage_Sheet_Flag_Present on page then
      IF FILE_STORAGE_SHEET_FLAG_PRESENT(page)THEN
          IF document _is_empty THEN
              EJECT_PAGE.
              PROCESS_FILE_STORAGE_SHEETS (page).
          ELSE
              RETURN document.
          END IF.
      ELSE
          EJECT_PAGE.
          ADD_TO_DOCUMENT(page).
      END IF.
  END LOOP.
END SCAN_DOCUMENT.
PROCESS_FILE_STORAGE_SHEETS(page)
BEGIN
      % Read the contents of the sheet into a local storage Folder.
      LET FOLDER = READ_FILE_STORAGE_SHEET(page).
          % Notify the user/operator of the system that a file storage sheet has
          been read.
      DISPLAY "FILE STORAGE SHEET READ INTO FOLDER"
      FOLDER_NAME (Folder).
END PROCESS_FILE_STORAGE_SHEETS.
READ_FILE_STORAGE_SHEET(first_page)
%     Once the scanner has scanned the first page of a file storage sheet, the
      system reads the Directory from the file storage sheet, creates a new file
      folder in local storage, and reads the individual files from the sheet into
      the file folder, scanning new pages as necessary. The first page is
      assumed to contain the entire Directory.
BEGIN
          % Call Read_File_Storage_Sheet_Label to obtain the decoded Label
          Info.
      LET    LABEL_INFO = READ_FILE_STORAGE_SHEET_LABEL
      (first_page).
          % Call Read_File_Storage_Sheet_Directory to obtain the decoded
          Directory Info.
      LET    DIRECTORY_INFO = READ_FILE_STORAGE_SHEET_
      DIRECTORY (first_page).
          % Call Create_Files_From_Directory to prepare local storage in the
          Folder for each file described by the Directory Info.
```

TABLE 2-continued

READING FILE STORAGE SHEETS

LET    FOLDER = CREATE_FILES_FROM_DIRECTORY(Folder, Directory_Info).
        %   Call Read_File_Storage_Sheet_Files to read the files specified by the Directory Info from the subsequent pages of the file storage sheet described by the Label Info, and store the data in the local storage Folder.
    READ_FILE_STORAGE_SHEET_FILES(Folder, Label_Info, Directory_info).
        %   Return the newly created Folder containing the files from the file storage sheet.
    RETURN FOLDER
END READ_FILE_STORAGE_SHEET.
CREATE_FILES_FROM_DIRECTORY (Folder, Directory_Info)
%   Given a file storage sheet Directory, create a corresponding Folder in local storage with empty files ready for storage. Add any Attributes, such as Title, Author, etc. that may be specified in the Directory_Info.
BEGIN
        %   Prepare a Folder in local storage with the name given in the Directory.
    LET FOLDER = CREATE_STORAGE_FOLDER (Folder_Name: Label_Info->Name).
        %   For each file described in the directory:
    LET NUMBER_OF_FILES = LENGTH(Directory_Info).
    FOR FILE_NUMBER FROM 1 TO NUMBER_OF_FILES
        %   Create in the local storage Folder an empty file with the attributes (name, author, etc.) specified in the Directory.
        CREATE_EMPTY_FILE IN FOLDER WITH ATTRIBUTES = DIRECTORY_INFO [file_number].
    END FOR
        %   Return the newly created folder ready to store the contents of the files
    RETURN FOLDER.
END CREATE_FILES_FROM_DIRECTORY.
READ_FILE_STORAGE_SHEET_LABEL(first_page)
%   Given the first page of a file storage sheet, read the Label for the sheet. The Label info contains information about the sheet as a whole, such as its title, number of pages, and unique identifier (UID).
BEGIN
        %   Get image data from the Label Area of the first page
    LET LABEL_IMAGE = GET_IMAGE_AREA "LABEL AREA" from the first_page.
        %   Read the Glyphs from the image data to obtain the Label Info.
    LET LABEL_INFO = READ_GLYPHS(Label_Image)
        %   Return the Label Info.
    RETURN Label_Info.
END READ_FILE_STORAGE_SHEET_LABEL.
READ_FILE_STORAGE_SHEET_DIRECTORY(first_page)
%   Given the first page of a file storage sheet, read the Directory Info. The Directory Info contains one entry for each file stored in the sheet.
BEGIN
        %   Get image data from the Directory Area of the first page
    LET DIRECTORY_IMAGE = GET_IMAGE_AREA "DIRECTORY AREA" from the first_page.
        %   Read the Glyphs from the image data to obtain the Directory Info.
    LET DIRECTORY_INFO = READ_GLYPHS(Directory_image).
        %   Return the Directory Info.
  RETURN Directory_Info.
END READ_FILE_STORAGE_SHEET_DIRECTORY.
READ_FILE_STORAGE_SHEET_FILES(Folder, Label_Info, Directory_Info)
%   We assume that all pages are from the same file storage sheet, and do not handle the case where pages of two different sheets are intermingled. Furthermore, for simplicity we assume that each page contains data from only one file.
BEGIN
        %   Get the UID from the Label Info.
    LET expected_uid = Label_Info->UID.
        %   Get the Number of pages from the Label Info.
    LET number_of pages = Label_Info->Page_Count.
        %   Enter a loop of scanning pages and accumulating in a list called file_data the following information: page number, file number, and partial file contents data:
        %   Begin with an empty list of file data.
    LET file_data = [ ].
        %   While there are more pages in the scanner:
    WHILE page_available
        %   Scan the page TABLE 2-continued

READING FILE STORAGE SHEETS

```
LET page = Scan_Page.
    %   Check to see if this page is a file storage sheet. If not, exit this
        loop.
    IF FILE_STORAGE_SHEET_FLAG_PRESENT(page)THEN
        EXIT WHILE LOOP.
    END IF.
    %   If the page is a file storage sheet, process it.
EJECT_PAGE.
    %   Get image data from the Page Label area of the page.
    LET page_label_image = GET_IMAGE_AREA "LABEL AREA" of
    page.
    %   Read the Glyphs from the image data to obtain the
        Page_Label data.
    LET Page_Label = READ_GLYPHS (page_label_image)
    %   Compare the UID of the sheet with the UID specified in this
        Page_Label.
    LET UID = Page_Label->UID
    %   If they don't match then
    If UID!= expected_uid THEN
        %   give an error because the page is not from the sheet whose
            first page we have read.
    ERROR ("This page is not from this file storage sheet").
        %   Else, continue processing:
        %   Get image data from the Data area of the page.
    LET data_image = GET_IMAGE_AREA "DATA AREA" of page
        %   Read the Glyphs from the image data to obtain the partial
            file contents data.
    LET data = READ_GLYPHS (data_image)
        %   Add to the file_data list:
        %   Page Number (from the Page Label)
        %   File Number for this page (from the Page Label)
        %   Data (from the glyphs on the page)
    APPEND {
        Page_Number: Page_Label->Page_Number,
        File_Number: Page_Label->File_Number
        Data:       data
    } to file_data
        %   Decrement the page count.
    LET number_of_pages=number_of pages-1
END WHILE.
    %   After scanning all pages, check to see all pages of the file
        storage sheet were read.
    %   If not, give a warning.
    IF (number_of_pages != 0) THEN WARN("Not all pages of this file
    storage sheet were read").
        %   Sort the collected data by page number, to account for any
            mis-ordering of pages.
SORT file_data by Page_Number.
    %   Finish by writing the data into the various files in the Folder:
    %   Get the Number of files from the Directory.
    LET number_of_files = LENGTH(Directory_Info).
    %   For each file described in the directory:
FOR i from 1 to number_of files
    %   Find the file in the Folder with the attributes specified in
        the directory info (title, etc.).
    FOR each Data in file_data where File_Number == i
        %  Get the data for that file from the file data list.
        LET File = FIND_FILE File in Folder where File Attributes
        == Directory_Info[i].
        APPEND it (in sequence) into the specified file entry in the
        Folder.
    APPEND_TO_FILE File, Data.
END READ_FILE_STORAGE_SHEET_FILES
```

As can be seen in Table 2, the reading and processing of file storage sheets preserves the conventions of files that today's users of computers have come to expect. If the system recognizes the current page as a part of a sheet then, the system reads and stores an electronic version of the machine readable files and places them in a folder for the user's convenience. If the current page is not a part of a sheet, the system exits this routine and continues with other processing instructions.

The presently preferred embodiment contains a number of simplifying assumption that need not be used in a final embodiment implementing the present invention. For example, the presently preferred embodiment assumes that all the files that are associated with the current file storage sheet are entered in the files directory found on the first page of the sheet. Likewise, it is assumed that all pages are from a single file storage sheet and not intermingled with pages from two or more file storage sheets and that each page in a sheet contains data only from one file. It will be appreciated that these simplifying assumptions are not necessary to the present invention and should not be considered as a limitation thereupon.

The method of creating file storage sheets is detailed below in Table 3:

TABLE 3

WRITING FILE STORAGE SHEETS

```
MAKE_FILE_STORAGE_SHEET(Folder)
    % Given a Folder, create and print a file storage sheet of the folder.
BEGIN
        % Write a sheet for the Folder into a list of Pages
        LET Pages = WRITE_FILE_STORAGE_SHEET(Folder).
            % For each page in the list of Pages
        FOR each page in Pages
            %   Print the page
            PRINT_PAGE(page).
        END FOR
END MAKE_FILE_STORAGE_SHEET
WRITE_FILE_STORAGE_SHEET (Folder)
    %   Create and return a list of pages to be printed.
    %   The Directory area contains the file attributes (titles, authors, etc.)
        in Glyphs.
    %   A human readable summary of the file attributes may also be
        present.
    %   The Label area contains the file attributes (titles, authors, etc.) in
        Glyphs.
    %   Similarly for the label data
    %   The first page contains the Directory, the Label, the constant areas
        (file storage sheet flag, etc.).
    %   If the directory is large, it will overflow onto subsequent pages.
    %   For simplicity, here it is assumed to that the directory will fit on the
        first page, though those skilled in the art will readily understand the
        modifications necessary to allow for multi_page directories.
    %   The subsequent pages each contain a Label, a Data area, and
        constant areas.
BEGIN
        %   Begin with an empty list of pages.
        LET pages = [ ]
            %   Begin numbering with page number = 1.
        LET page_number = 1.
            %   Create a blank page
        LET first_page = Create_Blank_Page.
            %   Place the flag on the page, in the flag location.
        PLACE_IMAGE_FILE_STORAGE_SHEET_FLAG at "Flag Location"
        on the page.
            %   Place a human readable text string giving the folder name at the
                Human Summary Area on the page.
        PLACE_TEXT "FILE STORAGE SHEET "FOLDER_NAME(Folder) at
        "Human Summary Area" on page.
            %   Add the Label Info for the sheet to the page.
        LET Label_Info = WRITE_FILE_STORAGE_SHEET_LABEL(page,
        Folder)
            % Add the Directory Info for the sheet to the page.
        LET     Directory_Info = WRITE_FILE_STORAGE_SHEET
        _DIRECTORY (Folder).
            %   Add the page to the pages list.
        ADD first_page to pages.
            %   Write the "data" pages of the sheet to the pages list.
        WRITE_FILE_STORAGE_SHEET_FILES(pages,       Label_Info,
        Directory_Info, Folder).
            %   Return the pages list.
        RETURN pages.
END WRITE_FILE_STORAGE_SHEET
WRITE_FILE_STORAGE_SHEET_LABEL(Page, Folder)
        %   Writes a Label describing Folder on the given Page.
BEGIN
        %  Create an empty "Label Info" structure
        LET Label_Info = Create_Label_Info( ).
            %   Create a Unique ID to stand for this sheet, and add it to the Label
                Info
        Label_Info->UID = CREATE_UNIQUE_ID.
            %   Add the Folder Name to the Label Info
        Label_Info->Name = FOLDER_NAME(Folder).
            %   Calculate the number of pages to be printed
        LET number_of pages = NUMBER_OF_FILE_STORAGE_SHEET
        _PAGES (Folder).
            %   Add the number of pages to the Label Info
        Label_Info->Pages = number_of pages.
            %   Encode the data in Label Info as an image of Glyphs
        LET label image_CREATE GLYPHS(Label Info).
            %   Place this image on the page in the Label Area.
```

TABLE 3-continued

WRITING FILE STORAGE SHEETS

```
        PLACE_IMAGE label_image at "Label Area" on page.
            %   Return the Label Info
        RETURN Label_Info.
END WRITE_FILE_STORAGE_SHEET_LABEL
WRITE_FILE_STORAGE_SHEET_DIRECTORY(Page, Folder)
%   Writes a Directory describing Folder on the given Page.
BEGIN
        %   Create an empty "Directory Info" structure
        LET Directory_Info = CREATE_DIRECTORY_INFO( ).
            %   Copy the file attribute data from the Folder to the Directory_Info
        FOR each File_Attribute in Folder
            ADD File_Attribute to Directory_Info.
        END FOR
            %   Encode the data in Directory Info as an image of Glyphs
        LET directory_image = CREATE_GLYPHS(Directory_Info).
            %   Place this image on the page in the Directory Area.
        PLACE_IMAGE directory_image at "Directory Area" on page.
            %   Return the Directory Info
        RETURN Directory_Info.
END WRITE_FILE_STORAGE_SHEET_DIRECTORY
WRITE_FILE_STORAGE_SHEET_FILES(Result,      Label_Info,
Directory___Info, Folder)
%   For each file in the Folder, write the Page Label and File Contents on
    pages and return the list of pages.
BEGIN
        %   Begin with file number = 1
        LET file_number = 1
            %   For each File in the Folder
        FOR each File in Folder
            %   Begin with byte_start = 0
            LET byte_start = 0
                %   Loop doing:
            LOOP
                    %   Create a blank page
                LET page = Create_Blank_Page.
                    %   Place the Flag at the Flag Location on the page
                PLACE_IMAGE File_Storage_Sheet_Flag at "Flag Location" on
page.
                    %   Place a human readable text string giving the file name at
                        the Human Summary Area on the page.
                PLACE_TEXT "File " File_Name(Folder[file_number]) at
"Human Summary Area" on page.
                    %   Create an empty Page Label data structure
                LET label_data = CREATE_PAGE_LABEL( ).
                    %   Add the current page number to the page label data
                page_label->Page_Number = page_number.
                    %   Add the current file number to the page label data
                page_label->File_Number = file_number.
                    %   Add the Unique ID of the current sheet to the label data
                page_label->UID = Label_Info->UID.
                    %   Encode the data in Page Label as an image of Glyphs.
                LET label_image = CREATE_GLYPHS(label_data).
                    %   Place this image on the page in the Directory Area.
                PLACE_IMAGE label_image at "Label Area" on page.
                    %   Read File_Storage_Sheet_Bytes_Per_Page bytes from the
                        Folder file indicated by file_number, starting at byte_start
                LET page_data = READ_FILE_BYTES(Folder[file_number],
                    byte_start,
                    FILE_STORAGE_SHEET_BYTES_PER_PAGE).
                    %   Encode this data as an image of Glyphs.
                LET data_image = CREATE_GLYPHS(page_data).
                    %   Place this image at "Data Area" on the page
                PLACE_GLYPHS data_image at "Data Area" on page.
                    %   Add File_Storage_Sheet_Bytes_Per_Page to byte_start
                LET     byte_start = byte_start +FILE_STORAGE_SHEET
                _BYTES_PER_PAGE.
                    %   Add the page to the Result list
                ADD page to Result.
                    %   If the new byte start is greater than the length of the file,
                        then exit the loop.
                IF byte_start > FILE_LENGTH(Folder[file_number]) THEN
                    EXIT LOOP.
            END LOOP.
                %   When done with a file, increment the file number and
                    continue with next file in Folder
            LET file_number = file_number + 1.
        END FOR.
```

TABLE 3-continued

WRITING FILE STORAGE SHEETS

```
        %   When done with all Files in Folder, return Result.
        RETURN Result.
END WRITE_FILE_STORAGE_SHEET_FILES
NUMBER_OF_FILE_STORAGE_SHEET_PAGES(Folder)
%   Subroutine to calculate the number of pages required, for
    Create_File_Storage_Sheet.
BEGIN
        %   Start with page count=1 page, for the Directory page
        LET page_count = 1.
            %   For each file in the folder
        FOR each File in Folder
                %   Divide the length of the file by
                    File_Storage_Sheet_Bytes_Per_Page, and round up any
                    fractional part to the next integer.
                %   Add this amount to the page count.
                page_count = page_count + round (File_Length (File) /
                File_Storage_Sheet_Bytes_Per_Page).
        END FOR
            %   When done with all Files in Folder, return page count.
        RETURN page_count.
END NUMBER_OF_FILE_STORAGE_SHEET_PAGES
```

To create a file storage sheet, the user passes a folder to the MAKE_FILE_STORAGE_SHEET routine. The interface means for passing the folder and making a file storage sheet may be via a graphical interface as discussed above or via a command interpreter or by the file storage sheet functionality may be embedded in some other computer system and invoked programmatically. The routine, in turn, creates the pages of the file storage sheet. The system creates pages of the sheet by placing a flag in the appropriate location. Additionally, the system writes the directory and label of the floppy at its location. Lastly, the system writes the digital data of the files at their appropriate beginning location on the sheet. As stated previously, the presently preferred embodiment assumes that each page in the sheet is associated with exactly one file in the folder.

In summary, the present invention is a novel form and method for creating and using paper, or a like medium, for the storage of digitally encoded data. This data is machine readable and writeable through an image terminal under processor control. File Storage sheets, constructed in accordance with the principles of the present invention, closely parallel the paradigm of magnetic floppy disk and implements the concept of "files". This novel medium provides low cost storage for a small number of files, a stable form factor and physical data storage mechanism for archival storage, as well as an additional interface for integrating the paper and electronic worlds accessible to most users.

What is claimed:

1. A system for retrieving optically encoded, machine readable files from a hardcopy medium, said system comprising:

an image input terminal for inputting the image of hardcopy media, wherein at least one said hardcopy media comprising:

a substrate sheet bearing marks, said marks including a code comprising an optically encoded, machine readable flag and file, said flag denoting that said file is encoded on said media and said file comprising a plurality of file structure attributes;

a storage area; and a digital processor wherein said processor receives said images from said image input terminal; decodes said marks on said images; and, if said flag is present among said marks, stores said file, once decoded, into said storage area in accordance with said file structure attributes.

2. The system, as recited in claim 1, wherein said at least one hardcopy media further comprises a plurality of substrate sheets bearing marks thereon, said marks comprising:

a machine readable flag for identifying said medium;

a machine readable directory;

a plurality of machine readable files, each said file having a plurality of attributes, said attributes being encoded in said directory.

3. The system, as recited in claim 1, wherein said attributes of said at least one hardcopy media include a name for said electronic files.

4. The system, as recited in claim 1, wherein said substrate sheet comprises paper.

5. The system, as recited in claim 1, wherein said substrate sheet consists of coated polyester.

6. The system, as recited in claim 1, wherein said substrate sheet further includes human readable material.

7. The system, as recited in claim 6, wherein said human readable material contains a listing of attributes of said files.

8. The system, as recited in claim 6, wherein said human readable material is user supplied.

9. The system, as recited in claim 6, wherein said human readable material is automatically generated.

10. The system, as recited in claim 6, wherein said human readable material is partially user supplied and partially automatically generated.

11. A method for processing a hardcopy medium by a processing system having an image terminal device, a storage area for storing electronic files, and a processor for executing functions upon said electronic files, wherein at least one said medium comprising a substrate sheet bearing marks thereon, said marks including a code comprising an optically encoded, machine readable flag and file, said flag denoting that said file is encoded on said media and said file comprising a plurality of file structure attributes, the method comprising the steps of:

(A) inputting the medium to the system;

(B) decoding the code to test for the presence of the flag; and (C) if the flag is present in step (B), storing the file, once decoded, as one or more electronic files into the storage area in accordance with the file structure attributes.

12. The method as recited in claim 11 wherein the inputting step of step (A) comprises scanning and capturing the image of said hardcopy medium.

13. The method as recited in claim 11, wherein said processing system further having a user interface means comprises display device, the method additionally comprising the steps of:

(A) displaying on said display device an icon representing said electronic file stored in said storage area; and (B) selecting said icon under user control for said user directed processing.

14. The method as recited in claim 13, wherein said processing of step (B) comprises copying said electronic files to said storage area.

15. The method as recited in claim 13, wherein said processing of step (B) comprises deleting files from said storage area.

16. A method for creating a hardcopy medium by a processing system having an image output terminal device, a storage area for storing electronic files having associated file structure attributes, and a processor for executing functions upon said electronic files, the steps of said method comprising:

(A) inputting an electronic file to said system;

(B) outputting at least one piece of substrate sheet bearing marks, said marks comprising an optical encoding of:
    at least one said electronic file;
    said associated file structure attributes of said at least one electronic file; and
    a machine readable flag, said flag indicating the presence of said at least one optically encoded file on said medium.

* * * * *